Oct. 28, 1952     L. S. KRAUS     2,615,842
METHOD OF AND APPARATUS FOR CONCENTRATING SEWAGE SLUDGES
Filed Oct. 24, 1946     2 SHEETS—SHEET 1
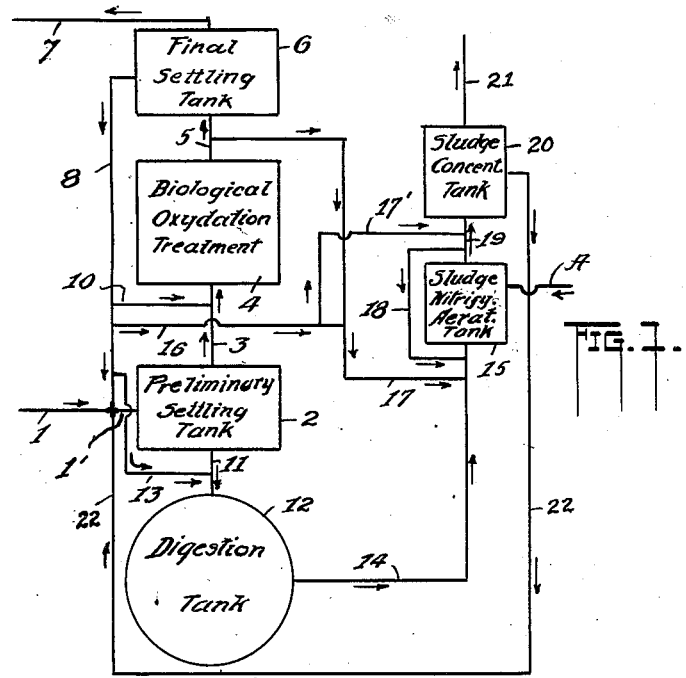
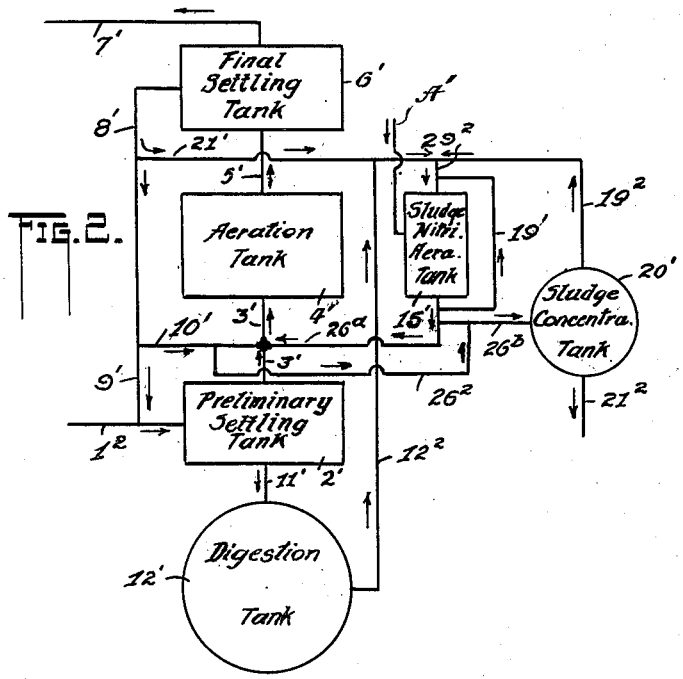
Inventor
L. S. Kraus,
By L. M. Hurlow
Attorney

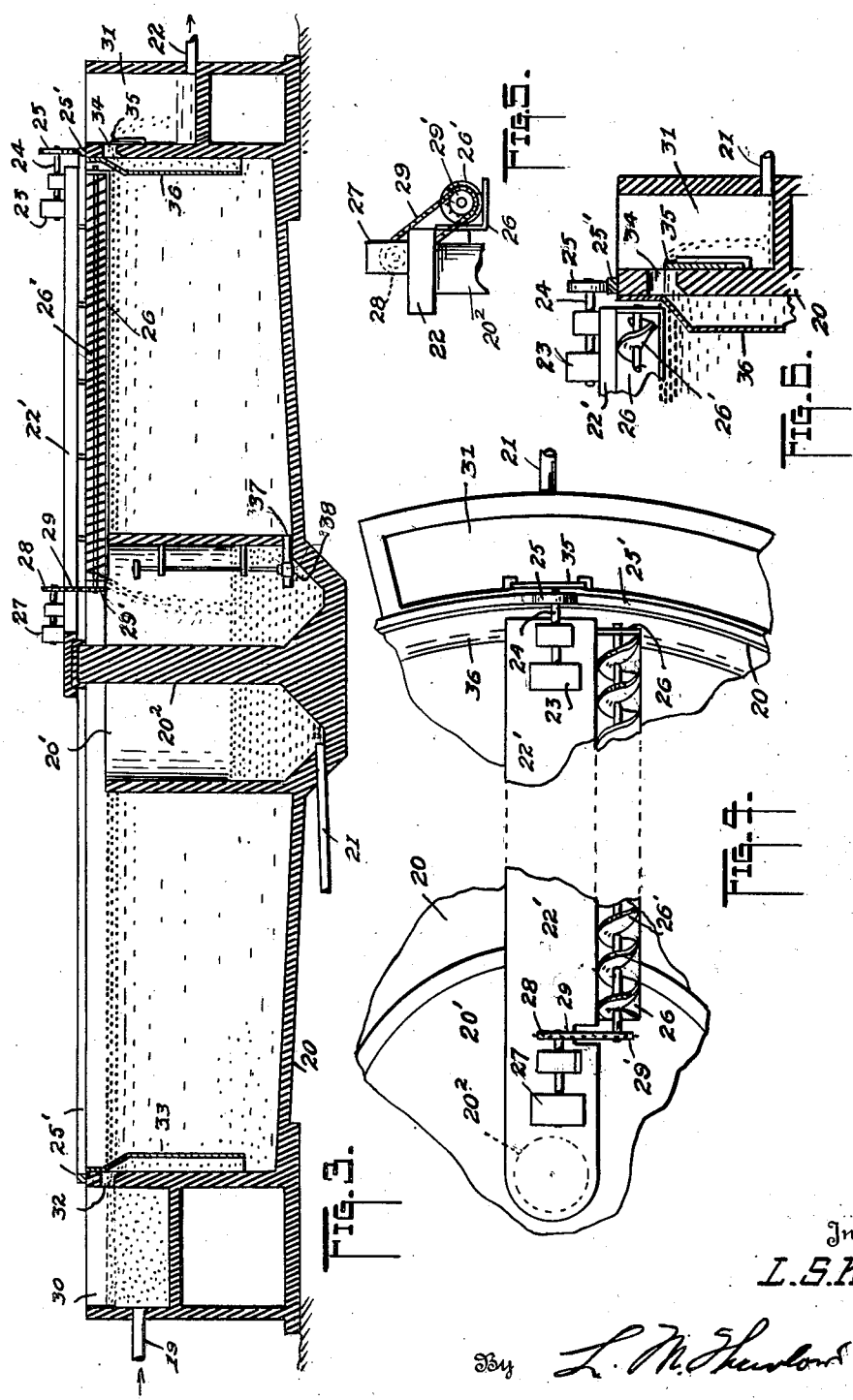

Patented Oct. 28, 1952

2,615,842

UNITED STATES PATENT OFFICE 2,615,842

METHOD OF AND APPARATUS FOR CONCENTRATING SEWAGE SLUDGES

Leon S. Kraus, Peoria, Ill.

Application October 24, 1946, Serial No. 705,269

5 Claims. (Cl. 210—2)

This invention relates to a method of, and apparatus for, concentrating sewage sludges to solids concentrations unattainable by normal or usual settling methods.

In the various methods now used for treating sewage by biological oxidation, particularly in the activated sludge process, much difficulty and cost is encountered in the final disposition of the sludge due to its dilute character, this being one of the most serious objections to the use of such methods. As an example, one of the most simple methods of sludge disposal is barging the liquid material to sea. It is evident that in this procedure the barge capacity required is inversely proportional to the solids concentration of the sludge resulting from the sewage treatment process. Thus if a sewage treatment-works requires two barge volumes per day with a waste sludge concentration of three percent solids, but one barge volume per day, only, is required if the waste sludge concentration is increased to six percent solids.

Likewise where sludge is dried on sludge drying beds as practiced, a much higher solids concentration of sludge would require less evaporation of water than one of low solids concentration. Thus a sludge containing six per cent solids concentration contains 51.6 per cent less water per pound of dry solids than a 3 per cent solids concentration sludge.

The object of this invention in view of the above is to produce a more concentrated sludge than is now obtained in the usual sewage treatment processes, by which to reduce the cost of treatment and increase the facility of sludge disposal.

This object is attained in the following manner: Sewage sludges containing ammonia are aerated in the presence of a proper concentration of nitrifying organisms such as are found in sludges resulting from biological oxidations until the ammonia nitrogen is wholly or partially converted into nitrite and nitrate nitrogen. The resulting nitrified sludge is then allowed to become quiescent in a settling chamber where the solids settle to the bottom. As denitrification proceeds such solids arise to the surface of the liquid bulk to rest thereon as a floating layer.

It is found that the sludge in the floating layer attains a considerably higher solids concentration than results in normal settling methods.

Again it is found that the solids concentration of sludge in the floating layer has a minimum density at the bottom thereof while there is a maximum density at the top of such layer.

Further, the denitrification process can be accelerated by adding to nitrified sludge a sewage sludge that has been through biological oxidation treatment.

Since the invention involves a method as well as apparatus for practicing the method the drawings herewith provided, and forming part hereof, will assist the understanding of the whole.

Figure 1 is a flow chart indicating the various parts of the apparatus employed.

Figure 2 is likewise a flow chart showing a different arrangement of the apparatus together with designation of flow direction as a variation from that of Figure 1.

Figure 3 is a vertical section of a receiver for flowable material, and apparatus mounted thereon including a screw conveyor.

Figure 4 is an enlarged detail in plan of parts shown in Figure 3.

Figure 5 is a detail in elevation of a conveyor as viewed from one end, and

Figure 6 is an enlarged detail in sectional elevation of the structure, also shown in Figure 3.

In the specification the following terms are used in the appended meanings:

*Digested sludge.*—Any liquid resulting from the methane or anaerobic fermentation of organic materials which contain suspended solids and which may be withdrawn from any part of a digestion chamber.

*Sewage.*—Any waste aqueous liquid containing settleable, dispersed, colloidal or dissolved organic materials or any combination of these materials.

*Nitrification.*—The process of converting ammonia nitrogen into nitrite and nitrate nitrogen by biological oxidation.

*Denitrification.*—The process of converting nitrite and nitrate nitrogen to gaseous nitrogen by biochemical means.

The procedure and method by which this process may be carried out is made apparent from the following and by a study of the figures of the drawings wherein no valves, or pumping means are shown, however, since well understood.

In Figure 1 raw sewage coming from the sewers is discharged through conduits 1 and 1' into a preliminary settling tank 2 wherein the settleable solids largely settle to the bottom, the effluent from said tank flowing through a conduit 3 to a tank 4 for any usual well known biological oxidation treatment. The biological oxidized effluent from said tank 4 flows through a conduit 5 to a final settling tank 6 for final removal of settleable solids, the clarified effluent from the said final settling tank being discharged through a conduit 7 for disposal in any desired manner.

The sludge removed from said tank 6 is discharged through a conduit 8 partly to the named preliminary settling tank 2 through the conduits 8 and 1', and partly to influent to a sludge nitrifying aeration tank 15 through conduits 16, 17 and 14. In the activated sludge process part of the final settling tank sludge is discharged from said conduit 8 and conduit 10 into the conduit 3 and thence into the biological oxidation treatment tank 4.

Settled sludge from the bottom of the preliminary settling tank 2 is discharged through conduit 11 to a sludge digestion tank 12 wherein the sludge solids are subjected to methane fermentation known as digestion, and wherein said solids are stabilized so that they may be disposed of without nuisance odors. In some instances the sludge from the final settling tank may not be discharged into the preliminary settling tank 2 but instead may be discharged through conduit 13 into conduit 11 and thence into the digestion tank 12. In the conventional procedure as usually practiced the digested sludge is withdrawn from the digestion tank 12 for final disposal.

As practiced herein, however, the digested sludge from said digestion tank 12 is discharged through conduit 14 to the influent to the named sludge nitrifying aeration tank 15. Simultaneously sludge from the final settling tank 6 is added to the influent of the sludge concentration tank through the conduits 8, 16, 17 and 14 together with effluent from the biological oxidation treatment tank 4 through conduits 17 and 14. In addition, part of the effluent from the sludge nitrifying aeration tank is passed through conduit 18 back into the influent of said sludge nitrifying aeration tank. The various materials added to the influent to the sludge nitrifying aeration tank are so proportioned that the suspended solids concentration in the contents of that tank are maintained at a level less than 10,000 p. p. m., having as the object of the treatment therein to convert part of the added ammonia nitrogen to nitrate and nitrite nitrogen. This is brought about by the nitrifying bacteria in the final settling tank sludge and the biological oxidation treatment effluent and the presence of dissolved oxygen which is supplied by adequate aeration, i. e., until part or all of the ammonia nitrogen is converted into nitrate and nitrite nitrogen.

That part of the effluent from the sludge nitrifying aeration tank not recirculated through conduit 18 passes through conduit 19 into a sludge concentration tank 20, the concentrated sludge being discharged through conduit 21 for final sludge disposal. This sludge disposal may be accomplished by any of the well known means, namely; digestion followed by drying on sludge drying beds, digestion followed by barging to sea, digestion followed by filtration, digestion followed by filtration and subsequent drying or incineration of the filter cake, digestion and discharge to lagoons, barging to sea, drying on drying beds, filtration and subsequent drying or incineration of the filter cake, and discharge to lagoons.

The sludge concentration tank effluent passes to the influent of the preliminary settling tank 2 through conduits 22 and 1'.

In order to accelerate the denitrification of the nitrite and nitrate nitrogen, and thus accelerate the floating of the sludge solids, part of the final settling tank sludge may be passed through conduit 17' and discharged into conduit 19 where it mixes with the effluent from the sludge nitrifying aeration tank. This is necessary where the retention period in the sludge nitrifying aeration tank is sufficient to permit a high degree of nitrification.

In Figures 3, 4, 5 and 6 the structure of the sludge concentration tank 20 is shown. Said tank in this instance is made of concrete. Central of its containing space is a well 20', a pedestal $20^2$ being erected centrally of said well. Supported upon and adapted to turn about the pedestal is one end of a platform 22' reaching across the tank. Mounted upon the platform is a power arrangement 23, a shaft 24 of which carries a supporting wheel 25 adapted to rest upon and travel upon and around a track 25' on the tank wall, the whole supporting the platform at its free end.

Suitably suspended from the platform is a housing 26 carrying within it a screw conveyor 26', said conveyor at one end overhanging the central well 20'. Mounted upon the platform is a power member 27 a sprocket wheel 28 of which, through a chain 29, drives the wheel 29' of said conveyor.

At each of the two opposite sides of the tank, outside the same, is a receiver separately identified by 30 and 31. Extending into the receiver 30 is the pipe 19 shown in Figure 1. In a wall of said receiver is an inlet port 32 leading into the containing space of said tank 20, there being a baffle 33 suspended at said port and within said space.

At the opposite receiver 31 is a port 34 leading from the tank, said port having thereat within such receiver a vertically adjustable weir 35 for governing the level of material within the named tank 20 and its flow therefrom. A baffle 36 depends from the position of the named port 34, within said tank space. Leading from the receiver 31 is the conduit 22 shown in Figure 1.

Within the central well 20' is a pipe 37 leading from the said tank space, and provided with a control valve 38. Also, leading from said well is a pipe 21 identified in Figure 1 by the same reference character.

Operation of the flow of material through the sludge concentration tank 20 is indicated in Figure 3. The effluent from the sludge nitrifying aeration tank passes through conduit 19 into said concentration tank into the receiver 30 and through influent port 32, the nitrified sludge being diverted directly downward by the baffle 33. As denitrification takes place with the attendant liberation of small bubbles of gaseous nitrogen the solids rise to the surface forming a floating layer of concentrated sludge. As the liquid passes toward the outlet from the tank the solids by arising are thus largely removed. The remaining liquor passes under and behind the baffle 36 and out through the effluent port 34, over the adjustable weir 35, discharging into the receiver 31, leaving the same through the conduit 22.

The rotating screw conveyor 26' carried and swung over the tank by the rotating platform 22' gathers the floating layer and discharges it into the central well 20', passing through the pipe or conduit 21 for final disposal. The pipe 37 and valve 38 are provided for the occasional removal of bottom sludge from the tank 20, and also for draining the same.

In Figure 2 a modified activated sludge process may be used wherein the sludge nitrifying aeration tank answers a dual purpose; first to control the settlability of the activated sludge, and second, to provide a nitrified sludge for sludge concentration.

As in Figure 1 the raw sewage from the sewers moves through a conduit 1² into the preliminary settling tank 2' wherein the settleable solids are largely removed as a sludge from the bottom of said tank. The effluent from said tank passes through a conduit 3' and is mixed with the return activated sludge passing through a conduit 10' and the mixture is discharged into aeration tank 4' wherein it is aerated for sufficient time and with sufficient air to effect the purification desired. The mixture of purified sewage and activated sludge is discharged through a conduit 5' into the final settling tank 6' wherein the activated sludge is removed from the purified sewage, the latter or final effluent, being discharged through a conduit 7' for final disposal.

The activated sludge leaves said final settling tank through conduit 8' and is partly returned to the aeration tanks through conduits 10' and 3'. Part of the activated sludge may be carried to the preliminary settling tank through conduits 8', 9' and 1² when desired.

Preliminary settling tank sludge is discharged through conduit 11' into digestion tank 12' wherein the sludge partly decomposed by the anearobic methane fermentation, and the digested sludge is passed through conduit 12² into conduit 21' where it mixes with part of the activated sludge from the final settling tank passing through the conduit 21'. This is then mixed with sludge concentration tank effluent passing through a conduit 19², the resulting mixture being discharged in the sludge nitrifying aeration tank 15' through conduit 29². The ammonia in the mixed sludges is partly converted to nitrite and nitrate nitrogen in said sludge nitrifying aeration tank, the biological action therein being accelerated by circulating the tank contents between the effluent and influent of said tank through conduit 19'. The nitrified sludges leave the sludge nitrifying aeration tank through conduit 26ª and part of said effluent is discharged to the aeration tank 4' through conduits 26ª and 3'. The remaining part of the nitrified sludge is discharged to the sludge concentration tank 20' through conduits 26ª and 26ᵇ wherein the sludge settles to the bottom of the tank and denitrification takes place causing the formation of small bubbles of nitrogen to become attached to the sludge particles as before described thus causing the particles to rise forming a floating layer. In order to increase the rate of denitrification part of the activated sludge passing through conduit 10' may be discharged into the sludge concentration tank through conduits 26² and 26ᵇ. This is only necessary when denitrification of the nitrified sludges progresses slowly due to lack of activity of the denitrifying bacteria. The effluent from the sludge concentration tank is discharged through conduits 19² and 29² to the influent to the sludge nitrifying aeration tank 15'.

The concentrated sludge is withdrawn from the surface of the floating sludge layer and is passed through conduit 21² for further treatment and disposal. In Figure 1 a pipe A supplies air to the tank 15, while in Figure 2 a pipe A' for air leads to the tank 15'.

The above process aided by the drawings, has been described on the basis of continuous flow of material. Continuous flow, however, is not essential, and in some cases is not the most desirable method of operation. It is entirely possible to operate in a step by step manner. Thus in Figure 2 the nitrified sludge may be used to control the settling characteristics of the activated sludge during one period and for sludge concentration purposes during a subsequent period. It is also possible to carry out the nitrifying aeration process and the sludge concentration process as "fill and draw" procedure, i. e., bulk by bulk, whereby the nitrifying aeration tank may be filled over one period and the contents discharged to the sludge concentration tank in which the concentrated sludge is formed after a sufficient period of time, and which in turn may be emptied by first withdrawing the liquor under the floating sludge layer from the bottom of the tank and then withdrawing the floating sludge layer through said bottom outlet, although this procedure would result in a less concentrated sludge than by the continuous procedure described.

In sewage treatment wherein the biologically oxidized sludge, such as activated sludge, contains nitrate and nitrite nitrogen sufficient to cause the sludge when placed in a relatively quiescent tank to rise to the surface due to denitrification, such a sludge may be concentrated to high solids concentrations by the use of the sludge concentration tank without the use of the sludge nitrifying aeration tank. In such a situation said biologically oxidized sludge may be carried directly into the sludge concentration tank, the effluent from which is passed to the preliminary settling tanks, and the concentrated sludge passed into the digestion tanks together with the preliminary settling tank sludge.

I claim:

1. In combination with apparatus for sewage treatment including a pipe for conveying sewage thereto, a biological oxidation apparatus, a final settling tank, and a sludge digestion apparatus, a second biological oxidation apparatus, a pipe connecting the bottom of the sludge digestion apparatus with the influent end of the said second biological oxidation apparatus so as to convey digested sludge thereto, a pipe connecting the effluent end of the latter with the influent end of the first named biological oxidation apparatus, a pipe connected to and between the bottom of said final settling tank and the influent end of said second biological oxidation apparatus, there being an outlet in said final settling tank for discharge of clarified liquor, a sludge concentration tank, a pipe connecting the effluent end of the second biological oxidation apparatus with the influent end of the sludge concentration tank, a pipe connecting the effluent end of the sludge concentration tank with the influent end of said second biological oxidation apparatus, and means for withdrawing concentrated sludge from said sludge concentration tank.

2. The combination with apparatus for sewage treatment including a pipe for conveying sewage thereto, a biological oxidation apparatus, a final settling tank, and a digestion tank, a nitrifying aeration tank, a pipe connecting the bottom of the digestion tank with the influent of said nitrifying aeration tank for conveying digested sludge thereto, a pipe connecting the underflow of the final settling tank with the influent end of said nitrifying aeration tank, a sludge concentration tank, a pipe connecting the effluent end of said nitrifying aeration tank with the influent of said sludge concentration tank, a pipe connecting the effluent end of said concentration tank with the influent end of said nitrifying aeration tank, means for withdrawing concentrated sludge from the concentration tank for discharge to the digestion tank, a pipe connecting the effluent end of said nitrifying aeration tank with the influent of the said biological oxidation apparatus, and a discharge pipe for clarified liquor in said final settling tank.

3. The combination with an apparatus for sewage treatment including a biological oxidation apparatus and means for conveying sewage thereto, a final settling tank, a pipe for discharging clarified liquor therefrom together with a pipe for conveying biologically oxidized sludge therefrom, and a digestion tank, of a nitrifying aeration tank, a pipe leading from the influent end of the latter to the inlet for the biologically oxidized sludge to the final settling tank, a pipe also leading from the influent end of said nitrifying aeration tank to the bottom of said digestion tank for conveying digested sludge to said nitrifying aeration tank, a sludge concentration tank, a pipe connecting the effluent end of the nitrifying aeration tank with the influent end of said concentration tank, a pipe connecting the effluent end of said concentration tank with the influent end of the nitrifying aeration tank, and means for conveying the concentrated sludge from the sludge concentration tank to the digestion tank.

4. The method of treating sewage which comprises the steps of settling the settleable solids of raw sewage in a preliminary settling zone, passing the effluent from the primary settling zone into a biological oxidation zone, passing the effluent from the biological oxidation zone into a final settling zone, passing settled solids from said final settling zone to a digestion zone, passing settled solids from said digestion zone and settled solids from said final settling zone to a nitrifying zone, aerating the mixture of settled solids in said nitrifying zone, passing effluent from said nitrifying zone into a quiescent sludge concentration zone wherein the solids undergo denitrification and accumulate at the surface in said quiescent zone and removing said accumulated solids.

5. The method called for in claim 4 wherein a portion of the effluent from said nitrifying zone is added to said sewage prior to its entry into said biological oxidation zone.

LEON S. KRAUS.

REFERENCES CITED

The following references are of record in the file of this patent:

UNITED STATES PATENTS

| Number | Name | Date |
| --- | --- | --- |
| 1,904,916 | Coombs | Apr. 18, 1933 |
| 1,957,185 | Weber et al. | May 1, 1934 |
| 1,981,310 | Currie | Nov. 20, 1934 |
| 1,986,332 | Fischer | Jan. 1, 1935 |
| 2,027,370 | Currie | Jan. 14, 1936 |
| 2,102,575 | Shafer | Dec. 14, 1937 |
| 2,337,507 | Thayer | Dec. 21, 1943 |
| 2,359,004 | Schlenz et al. | Sept. 26, 1944 |
| 2,360,811 | Kelly et al. | Oct. 17, 1944 |
| 2,364,022 | Gillard | Nov. 28, 1944 |
| 2,404,223 | Durdin | July 16, 1946 |
| 2,419,492 | Green | Apr. 22, 1947 |
| 2,442,241 | Kourzo et al. | May 25, 1948 |
| 2,458,163 | Hays | Jan. 4, 1949 |
| 2,517,792 | Kraus | Aug. 8, 1950 |